United States Patent Office 3,629,354
Patented Dec. 21, 1971

3,629,354
HALOGENATED HYDROCARBONS
William Q. Beard, Jr., Wichita, Kans., assignor to
Ethyl Corporation, New York, N.Y.
No Drawing. Filed July 14, 1969, Ser. No. 841,621
Int. Cl. C07c *11/04;* B01j *11/22*
U.S. Cl. 260—683.3                                11 Claims

ABSTRACT OF THE DISCLOSURE

Process for the preparation of vinyl chloride and the co-production of ethylene from ethane in the presence of oxygen and hydrogen chloride. A preferred catalyst includes copper or iron chloride, rare earth chloride, alkali metal chloride, and manganese chloride on a chromia-alumina support.

BACKGROUND OF THE INVENTION

The production of vinyl chloride is frequently a complicated process involving several steps. For example, Canadian Pat. 785,817 discloses a process requiring (a) reacting chlorine with ethane to yield ethyl chloride, (b) oxidatively chlorinating the ethyl chloride to dichloroethane, and (c) thermally decomposing the dichloroethane to vinyl chloride. By contrast, the present invention produces vinyl chloride by a much simplified process.

A purpose of the present invention is to produce vinyl chloride in a one-step process. Yet another purpose is to co-produce ethylene. Also, it is a purpose to produce both vinyl chloride and ethylene in good yields with a minimum of other by-products. Other purposes will become apparent from the following disclosure.

SUMMARY OF THE INVENTION

The present invention provides a process for the co-production of ethylene and vinyl chloride from ethane in the presence of hydrogen chloride and oxygen at a temperature above 350° F., the improvement comprising conducting the reaction in a fluidized catalytic bed of a supported metal halide selected from the group consisting of iron chloride and copper chloride in combination with a rare earth chloride.

In addition the invention involves a catalyst for the co-production of ethylene and vinyl chloride from ethane in the presence of hydrogen chloride and oxygen comprising, in combination, a metal chloride selected from the group consisting of copper chloride and iron chloride in combination with a rare earth chloride.

DESCRIPTION OF THE PREFERRED EMBODIMENTS

The purposes of the present invention are accomplished by contacting ethane, hydrogen chloride and oxygen (which may be pure or in air) with a fluidized catalyst at a temperature above 350° C., or preferably from about 400° C. to about 650° C., and a pressure above atmospheric, or preferably from about one atmosphere to about 30 atmospheres, the fluidized catalyst being composed of a mixture containing essentially from about 4 percent to about 18 percent copper or iron chloride and from about 5 percent to about 20 percent rare earth chlorides (hydrated) supported on a fluidized carrier, the percentages being based on the total weight of catalyst and support. The weight percent of the rare earth halides as set forth herein is based on the hydrated form, although such halides need not be hydrated during use.

According to this process, ethane is converted to vinyl chloride and ethylene without the occurrence of catalyst fouling. Furthermore, this method provides for the economical use of hydrogen chloride, which was at one time a troublesome by-product in the petrochemical industry and often disposed of by dumping into pits containing oyster shells, but now is in short supply and strong demand. Moreover, this process utilizes ethane, an abundant and inexpensive hydrocarbon, as a raw material for conversion into the more valuable chemicals, vinyl chloride and ethylene.

The primary reason for these improved results is the use of a fluidized, supported mixture of copper or iron chloride and rare earth chlorides. Preferred conditions are (in weight percent based on the total amount of catalyst and support) a catalyst mixture supported on a fluidized solid carrier containing essentially from about 4 to about 18 percent copper or iron chloride and from about 5 percent to about 20 percent rare earth halides (hydrated). Preferably, the catalyst mixture contains from about 6 percent to about 12 percent copper or iron chloride and from about 8 to about 15 percent rare earth chlorides (hydrated). When the amount of rare earth chlorides and copper or iron chloride in the catalyst significantly deviates from that specified above, or when either component is omitted, vinyl chloride and ethylene are produced in only small quantities, if at all. This very significant relationship between the amount of copper or iron chloride and rare earth chlorides will be illustrated by the examples set forth below.

By the term "rare earth chloride" is meant the chlorides of the elements in the Lanthanum series, that is, elements having an atomic number of from 57 through 71, and mixtures of these compounds. Included among the rare earth elements are thulium, lanthanum, cerium, praseodymium, neodymium, prometheum, samarium, europium, gadolinium, terbium, dysprosium, holmium, erbium, ytterbium, lutecium, yttrium. Among the elements cerium is preferred, but praseodymium and neodymium are also excellent catalyst components for the present process. However, since these materials are usually found in nature in mixtures, it is very convenient from the economic point of view to use a commercially available mixture. The mixtures used in formulating the catalyst contain rare earth chlorides or oxides or other mixtures. Examples of minerals containing the rare earths are zircon, thorite, monazite, gadolinite, cerite, orthite, and the like. The mixture known in the art as didymium is suitable, but the mixture extracted from monazite without removal of cerium and thorium is preferred.

The temperature of this process should be above 350° C. and should preferably range from about 400° C. to about 650° C. and more preferably from about 475° C. to about 600° C. It is desirable that the pressure range from about 1 atmosphere to about 30 atmospheres and preferably from about 1 atmosphere to about 20 atmospheres. The oxygen used in this invention is usually used in the form of air; however, pure oxygen may be employed if desired.

The fluidized support may be any of the known inert carriers such as sand, diatomaceous etrth, alumina, silica gel, pumice, bauxitt, chromia-alumina, and the like. Preferably the catalyst support is chromia-alumina, but alumina and silica are highly satisfactory. It is highly preferable that the particle size of the impregnated catalyst be within the range of from about 120 mesh to about 325 mesh (U.S. Sieve No.). In other words, the preponderance of the catalytic material be no coarser than about 120 mesh and no finer than about 325 mesh. There is no necessity that all particles be of uniform size. The size distribution generally varies throughout the ranges indicated. Usually it is preferred that no more than about 90 percent of the catalyst be finer than 325 mesh and that not more than about 50 percent of the catalyst be coarser than 120 mesh.

If desired, an alkali metal chloride may be added to the catalyst mixture in a concentration of from about 0.01 percent by weight to about 5 percent by weight, based on the total weight of catalyst and support. Preferably, it is added in concentrations of about 0.05 percent to about 3 percent and more preferably from about 0.1 to about 2 percent. The alkali metal chlorides employed are preferably the chlorides of lithium, sodium, potassium, rubidium and cesium. The addition of alkali metal chloride to the catalyst mixture is a preferred embodiment of the invention, and among the alkali metal chlorides, lithium chloride is most preferred.

Other catalyst additives also enhance the performance of the catalyst of this invention. Among such additives, manganese chloride in a concentration of from about 1 to about 10 percent by weight, based on the total weight of catalyst and support, is preferred. Other suitable catalyst additives include zinc chloride, calcium chloride, and titanium chloride, among which calcium chloride is preferred in a concentration of from about 1 to about 10 percent by weight, based on the total weight of catalyst and support.

The addition of iron chloride to the copper chloride containing catalyst, or vice versa, has also been found beneficial, depending upon the type and quantity of other components in the catalyst. A concentration of from about 1 to about 10 weight percent of the copper or iron chloride added, based on the total weight of catalyst and support, is preferred.

Another important feature of the invention is the molar fed ratio ethane/hydrogen chloride/air which varies in the ranges 1/1 to 4/2 to 6. When oxygen is substituted for air, the ranges are 1/1 to 3/0.4 to 1.2.

The rate of flow of gases through the reaction zone is subject to some variation. Thus, sufficient flow of gases must be provided for fluidization of the supported catalyst. On the other hand, gas flow should not be so extreme as to blow significant quantities of the catalyst out of the reaction zone. It is generally preferable that the superficial linear velocity of the gases entering the reactor be maintained within a range of from about 0.1 to about 5 feet per second. More preferably, for reasons of economy, the superficial linear velocity is maintained at from about 0.5 foot per second to about 3.5 feet per second at reaction temperature. A suitable contact time is one ranging from about 1 second up to about 20 seconds, and preferably, for best conversion, the contact time should be from about 2 to about 15 seconds.

The feed ethane, oxygen (which may be pure, in the form of air or mixed with inert diluents) and hydrogen chloride may be fed together into the bottom of the reactor. This can be varied however and it is indeed often desirable to do so. For instance, two of the reactants are fed into one portion of the reaction zone and the other reactant into another portion.

In order to more fully describe the invention, the following examples are given.

EXAMPLE I

Ethane, hydrogen chloride and oxygen were fed into the bottom of a vertically elongated reaction vessel in a molar ratio ethane/hydrogen chloride/oxygen of 1/4/0.63. The reaction vessel was precharged with 120 grams of a catalyst composed of 10.0 weight percent copper chloride, 10.0 weight percent cerium chloride (hydrated), 1.0 weight percent lithium chloride, and 4.0 weight percent manganese chloride (all percentages being based on the total weight of catalyst and support) supported on commercially available granular alumina. The feed rate was adjusted to maintain a superficial linear velocity of 0.249 feet per second at 425° C. reaction temperature and 1 atmosphere pressure. Operating in this fashion, an ethane conversion of 53.8 percent, ethylene yield of 38.4 percent, and vinyl chloride yield of 27.9 percent were achieved.

The ethylene and vinyl chloride are separated from each other and other impurities by quench and distillation.

EXAMPLE II

The preceding example is repeated so that it includes runs which differ with regard to use of the following copper chloride or iron chloride (substituted for copper chloride) concentrations (in weight percent, based on the total weight of catalyst and support): 1, 3, 5, 8, 12, 18, 20. Best results are indicated to be between 8 and 12 weight percent.

EXAMPLE III

The preceding examples are repeated so that each example includes runs which differ in the use of the following iron chloride concentrations where copper chloride is already employed or copper chloride where iron chloride is already employed (in weight percent based on the total weight of catalyst and support): 1, 3, 5, 7, 10.

EXAMPLE IV

The preceding examples are repeated so that each example includes runs which differ with regard to use of cerium chloride, didymium chloride, or rare earth chlorides extracted from monazite without removal of cerium or thorium, each in the following concentrations (in weight percent, based on the total weight of support and hydrated catalyst): 0.01, 0.1, 1, 5, 10, 15, 20, 25. Optimum results are indicated to be between 5 and 15 weight percent.

EXAMPLE V

The preceding examples are repeated so that each example includes runs which differ with regard to use of lithium chloride, sodium chloride, potassium chloride, rubidium chloride or cesium chloride, each in the following concentrations (in weight percent, based on the total weight of catalyst and support): 0.01, 0.05, 0.5, 1, 2, 5, 10. Lithium chloride performs best, and optimum results therefor are indicated to be between 0.5 and 2 weight percent.

EXAMPLE VI

The preceding examples are repeated so that each example includes runs which differ with regard to use of manganese chloride, calcium chloride, zinc chloride or titanium chloride, each in the following concentrations (in weigth percent, based on the total weight of catalyst and support): 0.01, 1, 5, 10, 20. Manganese chloride performs best, with calcium chloride being better than either zinc chloride or titanium chloride; optimum results for both manganese chloride and calcium chloride are indicated to be between 1 and 10 weight percent.

EXAMPLE VII

The preceding examples are repeated so that each example includes runs at the following temperatures: 300° C., 350° C., 650° C., and 700° C. Optimum results are indicated to be between 350° C. and 650° C.

EXAMPLE VIII

The preceding examples are repeated so that each example includes runs which differ with regard to use of the following catalyst supports: sand, diatomaceous earth, alumina, silica gel, pumice, bauxite, or chromia-alumina. Chromia-alumina performs best, with alumina and silica gel being better than the other supports.

EXAMPLE IX

The preceding examples are repeated so that each example includes runs which differ with regard to the following pressures (in atmospheres): 2, 5, 10, 13, 15, 20, 30.

EXAMPLE X

The preceding examples are repeated so thta each example includes runs which differ with regard to the use of pure oxygen or air as a component of the feed stream.

EXAMPLE XI

The preceding examples are repeated, first, omitting the rare earth component of the catalyst and, second, omitting the copper or iron chloride component of the catalyst, and inferior results are experienced in each instance. The preceding examples are further repeated with the following catalysts (in weight percent, based on the total weight of catalyst and support): (1) 3 percent copper or iron chloride and 4 percent rare earth chloride (hydrated), (2) 3 per cent copper or iron chloride and 21 percent rare earth chloride (hydrated), (3) 19 percent copper or iron chloride and 4 percent rare earth chloride (hydrated), (4) 19 percent copper or iron chloride and 21 percent rare earth chloride (hydrated), (5) 10 percent copper or iron chloride and 1 percent rare earth chloride (hydrated), (6) 1 percent copper or iron chloride and 10 percent rare earth chloride (hydrated). Poorer results are experienced in each instance.

While the catalytic mixtures of this invention can be deposited upon the fluidized solid support in a number of different ways, a very simple and highly preferred method of impregnating the support is to dissolve in water or an alcohol a weighed amount of the components of the catalyst mixture. A weighed amount of the support is then added to the water or alcohol and the contents stirred until completely homogenous. The water or alcohol is then evaporated at low temperature from the so-formed slurry. The evaporation is conveniently done by drying at a low temperature, e.g. about 100° C. in a low temperature air circulating oven. The dry impregnated support remaining can then be employed in the process of this invention.

What is claimed is:

1. In a process for the co-production of ethylene and vinyl chloride from ethane in the presence of hydrogen chloride and oxygen at a temperature above 350° F., the improvement comprising conducting the reaction in a fluidized catalytic bed of from about 4 to about 18 percent of a supported metal halide selected from the group consisting of iron chloride and copper chloride in combination with from about 5 percent to about 20 percent of a rare earth chloride, all concentrations being based on the total weight of catalyst and support.

2. The proces of claim 1 wherein said rare earth chloride is cerium chloride.

3. The process of claim 2 wherein the catalyst includes from 0.01 percent by weight to about 5 percent by weight of an alkali metal chloride.

4. The process of claim 3 wherein said alkali metal chloride is lithium chloride.

5. The process of claim 4 wherein said catalyst includes from about 0.01 to about 20 percent by weight of a compound selected from the group consisting of manganese chloride, calcium chloride, zinc chloride and titanium chloride.

6. The process of claim 5 wherein said compound is manganese chloride present in amount from about 1 to about 10 weight percent.

7. The process of claim 5 wherein the catalyst is supported by a support selected from the group consisting of silica gel, alumina, and chromia-alumina.

8. The process of claim 1 wherein said catalytic bed is composed of about 10 weight percent copper chloride, about 10 weight percent cerium chloride, about 1.0 weight percent lithium chloride and about 4 weight percent manganese chloride supported on granular alumina.

9. A catalyst for the co-production of ethylene and vinyl chloride from ethane in the presence of hydrogen chloride and oxygen comprising, in combination from about 4 to about 18 percent by weight of a metal chloride selected from the group consisting of copper chloride and iron chloride, from about 5 to about 20 weight percent by weight of a rare earth chloride, from about 0.01 to about 5 percent by weight of lithium chloride and from about 0.01 to about 20 percent by weight of a compound selected from the group consisting of manganese chloride, calcium chloride, zinc chloride and titanium chloride, all concentrations based on the total weight of catalyst and support.

10. The catalyst of claim 9 including both copper chloride and iron chloride.

11. The catalyst of claim 10 including a support selected from the group consisting of alumina, silica gel, and chromia-alumina.

References Cited

UNITED STATES PATENTS

| | | | |
|---|---|---|---|
| 2,308,489 | 1/1943 | Cass | 260—654 |
| 2,327,174 | 8/1943 | Cass | 260—654 |
| 2,838,577 | 6/1958 | Cook et al. | 260—656 |
| 3,205,280 | 9/1965 | Wattimena et al. | 260—680 |
| 3,210,431 | 10/1965 | Engel | 260—659 |
| 3,267,161 | 8/1966 | Okaji et al. | 260—659 |
| 3,483,136 | 12/1969 | Plas et al. | 252—441 |
| 3,496,242 | 2/1970 | Berkowitz et al. | 260—664 |

DELBERT E. GANTZ, Primary Examiner

G. E. SCHMITKONS, Assistant Examiner

U.S. Cl. X.R.

252—462; 260—656 R, 659 A, 662 A, 677 XA